March 6, 1951   F. A. GAUGER   2,544,454
AUTOMATIC LIGHTING AND CONTROL
MEANS FOR GAS BURNERS
Original Filed Feb. 5, 1944   5 Sheets-Sheet 1

INVENTOR.
FRANK A. GAUGER
BY
Arthur R. Woolfolk
ATTORNEY.

March 6, 1951   F. A. GAUGER   2,544,454
AUTOMATIC LIGHTING AND CONTROL
MEANS FOR GAS BURNERS
Original Filed Feb. 5, 1944   5 Sheets-Sheet 5

INVENTOR.
FRANK A. GAUGER
BY
Arthur R. Woolfolk
ATTORNEY

Patented Mar. 6, 1951

2,544,454

UNITED STATES PATENT OFFICE 2,544,454

AUTOMATIC LIGHTING AND CONTROL MEANS FOR GAS BURNERS

Frank A. Gauger, Milwaukee, Wis.

Original application February 5, 1944, Serial No. 521,201, now Patent No. 2,517,782, dated August 8, 1950. Divided and this application February 8, 1946, Serial No. 646,263

2 Claims. (Cl. 161—9)

This invention relates to automatic lighting and control means for gas burners, particularly for oven burners.

This application is a division of my prior application, Serial No. 521,201 filed February 5, 1944, for Automatic Lighting and Control Means for Gas Burners, now Patent No. 2,517,782, dated August 8, 1950.

Objects of this invention are to provide an ignition device for an oven burner which is located downwardly and usually laterally of a constantly burning pilot light, which ignition device is so made that absolute safety is obtained, it being impossible to turn on the gas to the oven burner unless a sub-burner, which constitutes an auxiliary pilot light, is in operation, and which is so arranged that when the device is first operated the sub-burner is first lighted and thereafter the oven burner is lighted, the arrangement being such that when the apparatus is not in operation and is not set for subsequent automatic operation, both the oven burner and sub-burner are cut off.

Further objects are to provide a novel arrangement of burner control particularly for gas stoves in which a thermocouple or thermocouples are employed, and in which the thermocouple in one instance is connected in a circuit with electromagnetic means for holding a valve open, such valve being manually opened and being biased towards closed position and controlling the flow of fuel to the burner, and to provide a regulator for regulating the temperature of the oven with a switch arranged in the same circuit as the electromagnetic means and the thermocouple so that when the regulator is turned to off position, the switch is opened and the valve is closed, and to provide clock controlled means for additionally opening the thermoelectric circuit at a preselected time to thereby cause the valve to close, the invention also contemplating the use of a second thermocouple or other source of electrical energy which is connected in a circuit with electromagnetic means for holding a manually closed valve in closed position, such valve being biased towards open position, clock controlled switch means being also in such circuit to allow opening of the valve at a preselected time.

Embodiments of the invention are shown in the accompanying drawings, in which.

Figure 1:
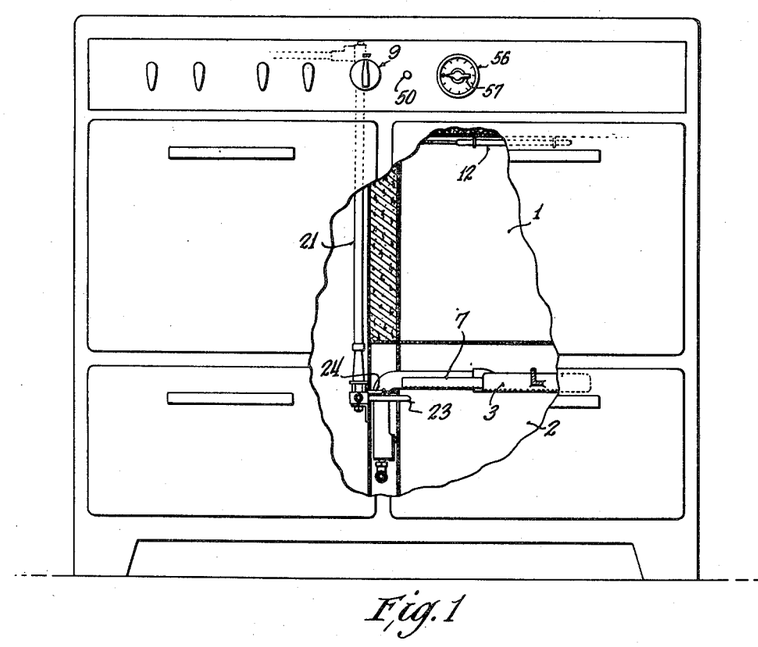
Figure 1 is a side elevation of a stove equipped with the ignition and control means, such view being partly broken away and partly in section.
Figure 2:
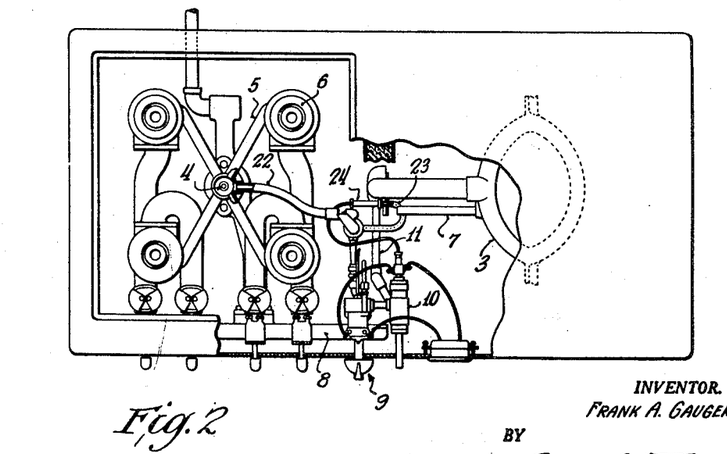
Figure 2 is a plan view of the stove, partly broken away and partly in section.

Referring to Figures 1 and 2, it will be seen that a gas stove has been illustrated which is equipped with an oven 1 and a broiler chamber or burner chamber 2. The oven burner is indicated by the reference character 3. Suitable insulation is provided in the walls of the stove a part of which has been illustrated. The stove is provided with a constantly burning pilot light 4, see Figure 2, which is connected by means of the usual ignition tubes 5 with the stove top burners 6. This pilot light is preferably of the hooded and ventilated type. The oven burner 3, as will be seen from Figure 2, is provided with an extension 7 which is arranged in lighting relation to a sub-burner hereinafter described.

The oven burner is supplied from the manifold 8 through the oven regulator indicated generally by the reference character 9. The oven regulator is connected in series with the manually controlled valve 10 which valve is biased towards closed position and is manually moved to open position. A pipe 11 leads from the valve 10 to the usual Bunsen mixer which supplies the oven burner.

The oven regulator 9 is of the well known type in which a main manually opened valve is substantially fully opened at the first portion of the rotation of the oven regulator during opening motion, and in which a second thermostatically controlled valve is connected in series with the manually opened valve. Since this oven regulator is of a well known construction a detailed description thereof will not be given. For instance, it could be of the type disclosed in the patent to Weber et al. No. 2,303,011 of November 24, 1942, for a Valve.

The thermostatic bulb is indicated by the reference character 12 and is connected to the regulator for automatically operating the regulator, such bulb 12 being located in the oven 1 as shown in Figure 1. The oven regulator indicated generally at 9 is so arranged that the manually opened valve, which is not automatically controlled and forms a part of the oven regulator 9, turns on a supply of gas to the pipe 13, see Figure 10, which pipe supplies the sub-burner and the extension burner hereinafter described.

Figures 3, 4, 5, 6, 7, 8, 9:
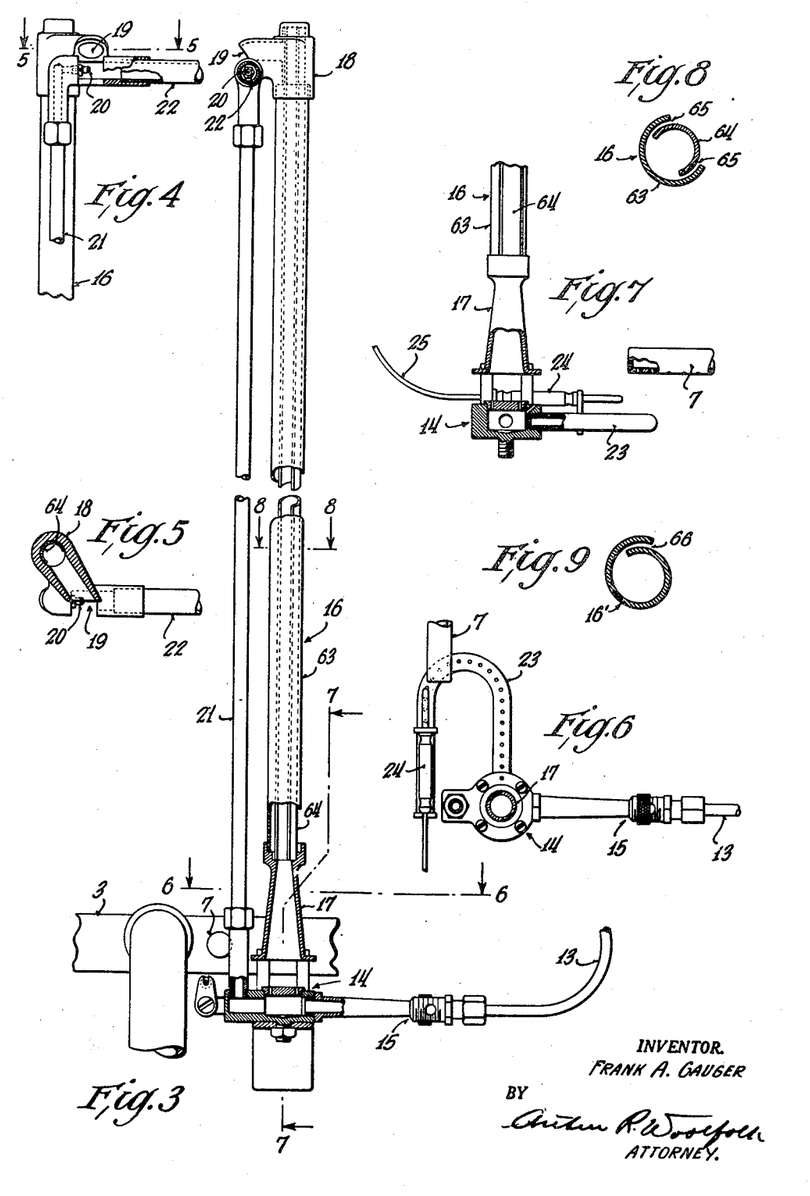
Figure 3 is an elevation, partly broken away and partly in section, of the ignition means.
Figure 4 is a side elevation, partly in section and partly broken away, looking at the left upper portion of Figure 3.
Figure 5 is a sectional view on the line 5—5 of Figure 4.
Figure 6 is a sectional view on the line 6—6 of Figure 3.
Figure 7 is a sectional view on the line 7—7 of Figure 3.
Figure 8 is a sectional view on the line 8—8 of Figure 3.
Figure 9 is a sectional view corresponding to Figure 8 showing a modified form of construction.

The pipe 13 leads to a sub-burner indicated generally by the reference character 14, see Figure 3, and supplies such sub-burner through an adjustable Bunsen mixer indicated at 15. The sub-burner is located at the bottom of a downwardly extending flame conducting tube indicated generally by the reference character 16. This downwardly extending tube terminates at its lower end in an upwardly converging conical hollow member 17 which is adapted to collect the combustible mixture from the sub-burner 14 and to lead such mixture into the tube 16. The upper end of the tube 16 extends into a fitting 18 which has a laterally extending outlet portion 19, such portion being preferably slightly turned downwardly on its upper side as shown most clearly in Figure 3. The fitting 18 is rigid with an extension burner 20 which is supplied with a combustible mixture through the pipe 21 communicating with the interior of the sub-burner 14, as shown in Figure 3. The extension burner 20 projects the combustible mixture into a laterally extending flame conducting pipe 22 which is seated within a portion of the fitting 18 and also seated within the housing surrounding the constantly burning pilot light 4, as shown in Figure 2.

It is to be noted particularly from Figures 6 and 7 that the sub-burner 14 is provided with a U-shaped extension 23 which is in lighting relation with the oven burner 3 by means of the extension 7 of the oven burner. It is to be noted also that an intermediate portion of the extension 23 of the sub-burner 14 is in lighting relation with the extension 7 of the oven burner and that the extreme end of extension 23 of the sub-burner is adapted to heat one end of a thermocouple 24. The reason for having the thermocouple at the extreme end of the extension 23 is to insure that the combustible mixture is lighted throughout the entire extent of the extension 23 to insure lighting of the oven burner.

Figures 10, 11, 12, 13, 14, 15, 16, 17:
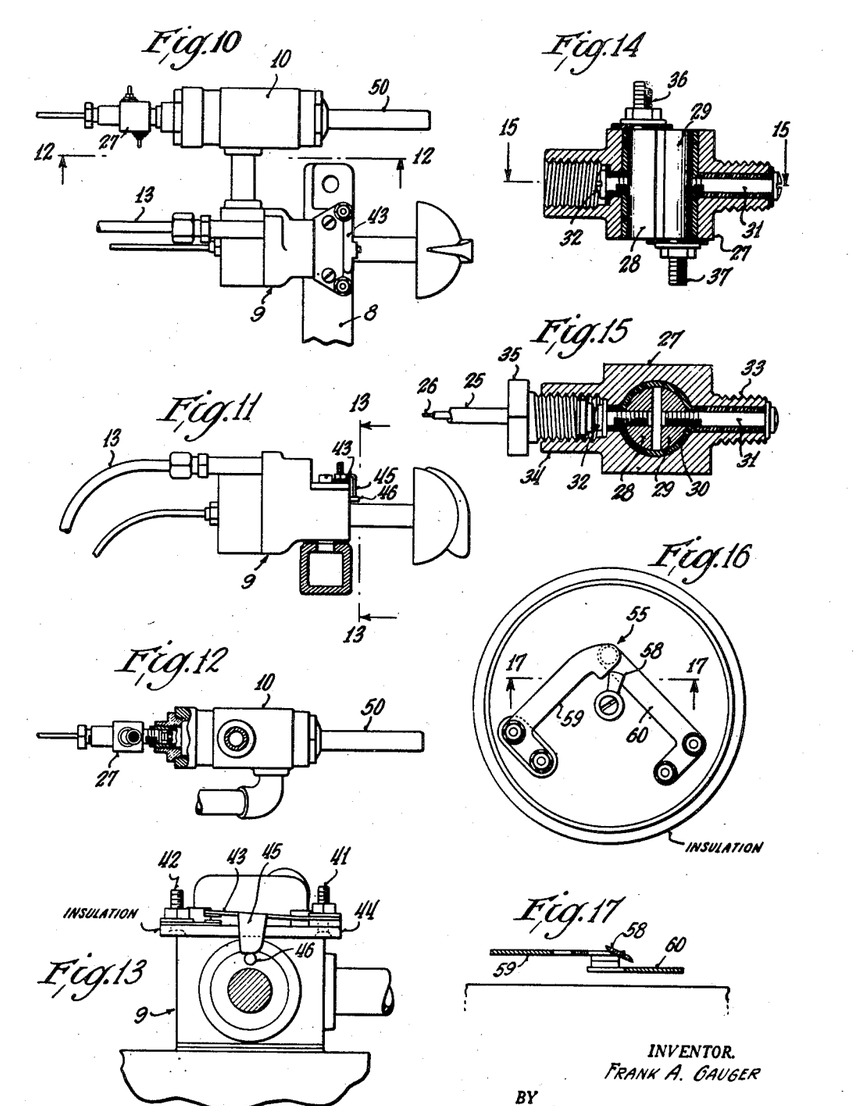
Figure 10 is a plan view of the oven controlling regulator and the manually opened valve.
Figure 11 is a side elevation, partly in section, of the regulator.
Figure 12 is a sectional view on the line 12—12 of Figure 10.
Figure 13 is a sectional view drawn to an enlarged scale on the line 13—13 of Figure 11.
Figure 14 is a view, partly in section, showing one of the connecting means for the circuit of the thermocouple.
Figure 15 is a sectional view on the line 15—15 of Figure 14.
Figure 16 is a rear view of a clock for opening the circuit of one of the thermocouples.
Figure 17 is a sectional view on the line 17—17 of Figure 16.

The thermocouple 24 is provided with two conductors that extend therefrom, which conductors consist of an outer copper tube 25 which carries within it a second conductor 26 which is insulated from the tube by means of a sheath, the construction being most clearly shown in Figure 15. The thermocouple 24 is held by suitable brackets at opposite ends thereof and is supported from the extension 23 of the sub-burner 14. The fitting shown in Figures 14 and 15 is employed in order to make it possible to connect an instrumentality or instrumentalities in series with the conductor 26. The fitting may comprise a metallic member 27 which is bored out transversely and which has conductors in the form of partial cylinders indicated at 28 and 29. These metal members 28 and 29 are insulated from the body portion 27 by means of the insulating sheath 30. The member 29 is held in place by a headed screw 31 and the member 28 is held in place by means of a headed screw 32. These screws are insulated from the body portion 27.

The body portion is provided with a projecting, externally threaded part 33 at one end and with an internally threaded portion 34 at the other end. The internally threaded portion is adapted to receive the screw threaded member 35 which electrically connects the copper tube 25 with the body portion 27 and forces a headed end electrically connected to the conductor 26 into contact with the head of the screw 32 and consequently places the conductor 26 in electrical connection with the member 28.

Figures 18, 19:
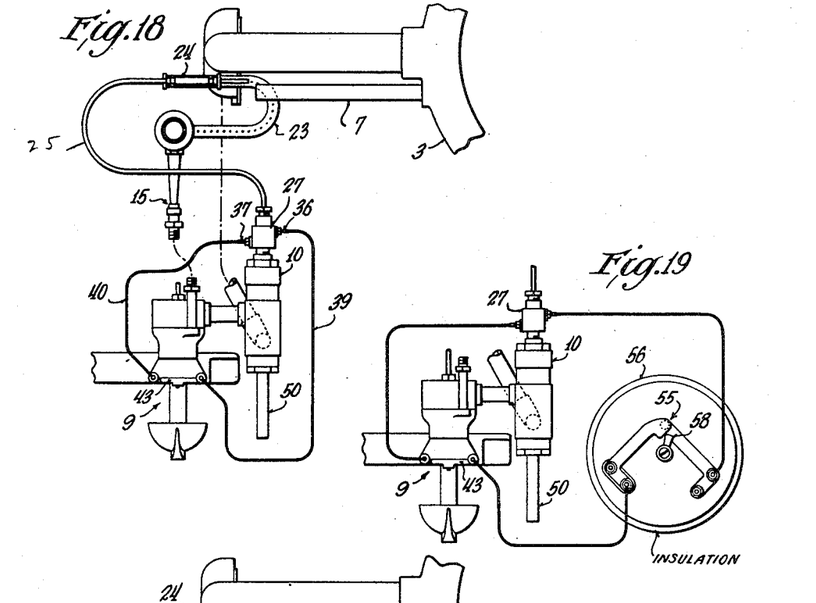
Figure 18 is a view showing the arrangement where a clock is not employed in the circuit of the thermocouple.
Figure 19 is a view corresponding to Figure 18 showing the arrangement when a clock is employed in the circuit of the thermocouple.

The members 28 and 29 are provided with threaded studs 36 and 37 respectively which project from opposite sides, as shown in Figure 14, and are adapted to receive conductors so as to connect other apparatus in series with the live wire 26 of the thermocouple. The externally threaded extension 33 is adapted to be screwed into the body portion of the valve 10, as shown in Figure 18, and to be connected to one side of the winding of the electromagnetic members 38, see Figure 21, the other side of the winding being grounded on the frame of the valve. The terminals 36 and 37, see Figures 14 and 18, are connected respectively by means of the conductors 39 and 40 with the terminals 41 and 42 of a switch 43 insulated from and carried by the regulator indicated generally at 9 in Figure 13. The switch is carried on an insulating block 44 supported from the regulator 6 and its movable arm is actuated by means of a cam like member 45 rigid therewith which is adapted to be normally held in open position by means of a pin 46 on the rotary portion of the regulator. The position of the parts when the regulator has been turned manually to cut off position is shown in Figure 13.

Figures 21, 22:
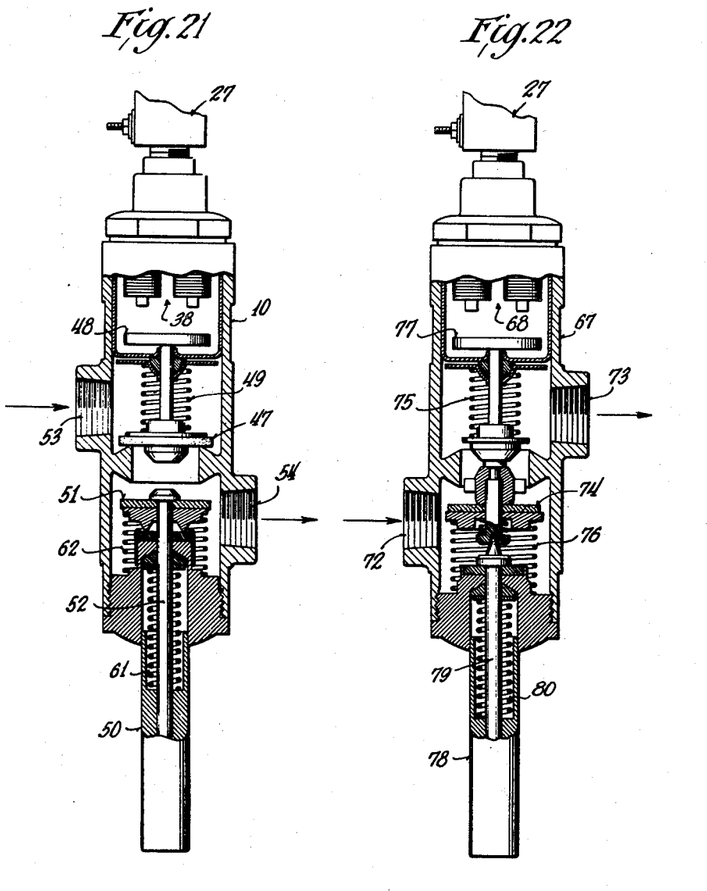
Figure 21 is a sectional view showing a manually opened valve which is biased towards closed position.
Figure 22 is a sectional view showing a manually closed valve which is biased towards open position.

In this position it will be seen that the switch is opened and the circuit through the electromagnet 38 of the valve 10, see Figures 21 and 18, is interrupted. At the first portion of the movement of the regulator in a clockwise direction towards on position as viewed in Figure 13, the switch will be closed and the circuit through the thermocouple and the electromagnet of the valve 10 will be completed. However, even when the thermocouple 24 is heated and the maximum current flowing through the winding of the electromagnet 38, such electromagnet does not exert sufficient force to open the valve. If desired, the pin 46, see Figure 13, can be of insulating material, though this is not necessary for it will be seen from an examination of Figure 18 that when the switch is opened, it is immaterial whether or not the wire 39 is grounded as the wire 39 is directly connected to the live wire of the thermocouple 24 and consequently merely serves to ground the live wire.

The valve shown in Figure 21 is a well known type. It is provided with a valve disk 47 connected by means of a spindle passing through suitable packing with an armature 48. The electromagnet 38 even when energized by the maximum current generated by the thermocouple is not strong enough to pull the valve to open position against the action of the spring 49. The valve 47 has to be manually moved to open position and when moved to this position will remain in such position if the thermocouple 24 is heated and will be released and will automatically move towards closed position, when the thermocouple is not heated, by means of the spring 49, for it will be noted that the valve is biased towards closed position. The manual means for opening the valve may comprise a plunger 50 which projects outwardly from the valve body and is itself provided with a valve disk 51 adapted to seat and close the opening through the valve 10 prior to unseating of the valve disk 47, the plunger being rigid with a rod 52 which passes through the valve disk 51 and is adapted to be moved after the valve disk 51 seats so as to unseat the valve 47. During this operation no gas passes from the inlet to the outlet of the valve 10. However, when the plunger 50 is released, it moves back to the position shown in Figure 21 but the valve 47 remains in open position provided the electromagnet 38 is energized and gas passes from the inlet to the outlet. For the sake of clearness the inlet 53 and the outlet 54 have been shown as having their axes in the same plane, though they may be placed at right angles to each other if so desired.

If desired, the circuit shown in Figure 18 may be supplemented by means of a clock controlled switch indicated generally at 55 in Figures 16 and 19. The switch is carried preferably on the back of a clock 56. The clock is of the type adapted to be set for so many minutes or so many hours before it comes to its final stopped position, which final stopped position is shown in Figures 16 and 19. The clock 56 is preferably encased in an insulating housing so that none of its works are grounded on the frame of the stove, though the clock is mounted on the frame as shown in Figure 1. The clock 56 is provided with a thumb piece 57, see Figure 1, which also constitutes a winding means so that the clock may be wound to any extent as indicated on the front dial of the clock so that it may be set for any time interval before it will arrive at its stopped or final position shown in Figures 16 and 19.

The rear of the shaft carrying the hand operated pointer and winding means 57 carries a metallic cam arm 58, see Figures 16 and 19. This cam arm is shaped as shown in Figure 17 and is adapted to ride under one of the spring arms 59 of the switch and lift such spring arm out of contact with the spring arm 60, both such arms being insulated from the body of the stove. However, the spring arm 60 is electrically connected to the metallic works of the clock. In other words, it is electrically connected through the metal portion of the clock to the metal cam member 58. When this clock controlled switch is used, it is connected in series with the thermocouple, the winding of the electromagnet of the valve 10, and the switch of the regulator 9, and when the clock is approaching stopped or zero position, the cam member 58 rides beneath a portion of the spring arm 59, as is apparent from Figure 17, and lifts the spring arm 59 out of contact with the spring arm 60. However, the circuit is maintained as the metal cam member 58 is electrically connected to the spring arm 60. However, when the cam 58 moves from beneath the spring arm 59 as it arrives at its final stopped position, the spring arm 59 will drop from the cam member 58 and the circuit will be momentarily interrupted before the spring arm 59 again engages the spring arm 60. During this interval the electromagnet 38 releases its armature 48, see Figure 21, and the valve 47 moves to closed position under the influence of the spring 49. It cannot be reset to open position until after it is manually operated by the plunger 50, though the circuit through the electromagnet 38 is immediately again closed by the clock operated switch hereinabove described. It is to be noted with reference to the valve shown in Figure 21 that the spring 61 overpowers the spring 62, the spring 62 serving to hold the valve disk 51 in seated position while the rod 52 is passing therethrough and unseating the valve 47.

From the description thus far given it is apparent that when it is desired to light the oven burner, the regulator 9 is first turned on, the initial motion of the regulator as it is being rotated to on position closing the circuit through the electromagnet of the valve 10 and the thermocouple 24. This setting of the regulator furnishes gas to the pipe 13 through the manually opened main valve of the regulator independently of the thermostatically controlled valve thereof. The gas from the pipe 13 passes through the Bunsen mixer 15 and supplies a combustible mixture to the sub-burner 14 and its extension 23 and also supplies combustible mixture to the extension burner 20. The sub-burner charges the downwardly extending tube 16 with a combustible mixture and the extension burner 20 charges the laterally extending tube 22 with a combustible mixture. The combustible mixture in the laterally extending tube 22 is ignited from the constantly burning pilot light 4 and the extension burner 20 is, therefore, lighted. It is to be noted that the slightly downwardly extending opening 19 projects the combustible mixture from the upper end of the downwardly extending pipe 16 into proximity to the extension burner 20 and consequently such combustible mixture is ignited and the flame travels down the tube 16 and lights the sub-burner 14, the extension 23 also lighting. After an interval of a few seconds allowing the thermocouple 24 to heat, the operator presses the plunger 50 of the valve 10 inwardly and allows gas to pass to the oven burner 3. The oven burner is in lighting relation to the extension 23 by means of its extension 7 and consequently the oven burner is lighted from the sub-burner. On the other hand, if the sub-burner had not been lighted, the thermocouple 24 would not furnish any current to energize the magnet 38 of the valve 10 and consequently it would be impossible for gas to pass to the oven burner.

In order to carry the flame downwardly of the downwardly extending pipe 16, such pipe is made in a peculiar manner. It is so made that a continuous unbroken column of combustible mixture extends from its lower to its upper end prior to ignition and also is maintained prior to ignition independently of the temperature of the tube 16 and consequently independently of the stack velocity. This is accomplished in several different ways, a few of which have been shown. It is to be noted from an examination of Figures 3 and 8 that the tube 16 consists of an outer tube 63 and an inner tube 64, the marginal edges of the outer tube 63 overlapping the marginal edges of the inner tube 64 and such tubes being turned in opposite directions and being arranged in nested relation. Each of these tubes has a widely open section extending longitudinally thereof which open section is spanned by the other of the tubes. It is to be noted that the tube 63 has outwardly extending edges that overlap or overhang the tube 64 and that the tube 64 has inwardly overlapping or overhanging edges which extend inwardly of the tube 63. This provides restricted vent spaces 65 on opposite sides which when the stack velocity is rapid allows the entrance of outside air, but this air is so directed that it causes a combustible column of mixture to be maintained within the composite tube 16 and does not cause intimate commingling of the outside air with all portions of the combustible mixture in the tube 16. Instead it has been found that a continuous column of combustible mixture extends from the bottom to the upper end of the downwardly extending tube 16. It is to be noted that the stack velocity even when the tube is hot is not such as to prevent the downward propagation of the flame. A definite predetermined quantity of combustible mixture passes through the Venturi like or funnel like member 17 into the tube 16. The suction immediately above this member 17 produced by the heated tube 16 is broken, so to speak, as the side slots begin immediately above the member 17. Also at all points along the tube 16 the suction, and consequently the stack velocity, cannot increase above the desired limit as outside air is immediately drawn through the longitudinally extending slots 65 and consequently great suction is not exerted on the continuous column of combustible mixture carried within the composite tube 16 and consequently the stack velocity never exceeds the right value to insure downward propagation of the flame.

Instead of following the construction shown in Figure 8 other constructions may be employed. For example, as shown in Figure 9, the tube 16' is formed of spiral shape and has overlapping marginal edges one of which is directed outwardly and the other of which is directed inwardly of the tube. These marginal portions overlap a slightly greater amount than the overlap shown in Figure 8 and provide a longitudinally extending slot 66.

It is to be noted that with this type of tube the outside air that is drawn in serves to spin the mixture within the tube 16' and inasmuch as the combustible mixture is of less specific gravity than the incoming air, it will be maintained in a solid unbroken column centrally of the tube 16' and the heavier incoming air will rotate externally of this unbroken column of combustible mixture.

While preferred constructions of the downwardly extending tube have been shown, it is to be distinctly understood that modifications could be made without departing from the spirit of this invention. For example, instead of using the sheet metal type of tubes described, the tubes could be formed of cast metal provided the tubes had the characteristics hereinabove set forth. It is also apparent that the slot or slots extending longitudinally of the tube need not be continuous. They could be formed by a series of openings provided the characteristics hereinabove set forth were maintained. From actual observation of this apparatus while it is in operation, it has been found that there is a trailing flame on the outer side of the tube 16 as well as the propagation of the flame downwardly interiorly of the tube 16. This trailing flame externally of the tube is most pronounced when the device is cold and is operated for the first time. As the device heats up, the outside trailing flame becomes less and less prominent.

Another advantage which results from this construction is that the explosion within the downwardly extending tube is softened up, so to speak, and is not a violent cannon like blast. Instead it has only a very small explosive effect making at most a very slight sound.

In operating the device, therefore, all that is necessary is for the operator to first turn on the regulator 9, thereby jointly supplying fuel to the sub-burner 14 and the extension burner 20, see Figures 3 and 4. This causes lighting of the sub-burner and heating of the thermocouple 24, see Figure 6. Thereafter the operator merely presses the plunger 50 of the valve 10, see Figures 18 and 19, and thus lights the oven burner. In either circuit the operator can cut off the oven burner and also the sub-burner and extension burner by merely rotating the regulator 9 back to its zero position, thus opening the circuit and allowing the valve 10 to close. If the circuit shown in Figure 19 is employed, the operator may set the clock for the desired time at which the oven burner will be cut off. This is accomplished, as previously described, by means of the clock controlled switch which momentarily opens the electric circuit and allows the valve 10 to close.

Thereafter the operator moves the regulator 9 to its zero position, thus cutting off supply of gas to the sub-burner 14 and extension burner 20.

Figure 20:
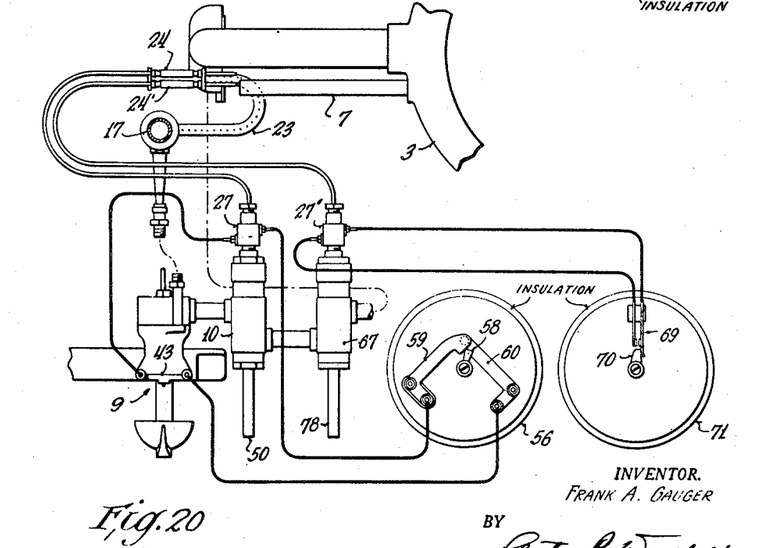
Figure 20 is a view corresponding to Figure 18 showing the arrangement when two clocks are employed together with two thermocouples.

In the form of the invention shown in Figure 20 not only the time of cut off of the oven burner can be controlled by means of a clock controlled switch, but in addition the time at which the oven burner will be turned on can also be controlled by a clock controlled switch. The same clock controlled switch previously described is shown in Figure 20 for controlling the cutting off of the oven burner. However, an additional thermocouple 24' is provided which furnishes energy for holding the normally opened valve 67, see Figures 20 and 22, in open position after it has been manually opened and after the thermocouple 24' has heated up. The circuit for the electromagnet 68, see Figure 22, of the valve 67 includes the clock controlled switch indicated generally at 69 in Figure 20. This clock controlled switch is connected in series with the winding of the electromagnet 68, see Figure 22 and the thermocouple 24', see Figure 20, and when opened by the cam portion or arm 70 of the clock 71 breaks the circuit and allows the valve 67 to move to open position. The clock 71 is carried in an insulating casing and is not grounded to the frame work of the stove. When this clock is used, it would be mounted to the right of the position of the clock 56 shown in Figure 1 and similarly would be provided with a combined winder and pointer on its front side and a suitable dial. It is adapted to be set for any desired length of time before it returns to its zero position, as shown in Figure 20, in exactly the same way as previously described for the clock 56. The arms of the switch 69 are provided with suitable contacts and are preferably both insulated. It is immaterial whether one of the arms is grounded to the metal works of the clock 71 at the time of cut off as shown in Figure 20, for this grounding would merely ground the live side of the circuit of the thermocouple 24' at a point in advance of the electromagnet winding 68 at the instant that the switch was opened.

The valve 67 is provided with the inlet 72 and the outlet 73. The valve 67 is connected in series with the valve 10, as shown in Figure 20, so that gas has to pass both valves before it arrives at the oven burner. The valve 67 is of a well known type and is provided with a valve disk 74 which is biased by means of the spring 75 towards open position, as shown in Figure 22. It is urged towards closed position by a lighter spring 76 which is overpowered by the spring 75 when the electromagnet releases the armature 77. The armature is moved into holding relation to the electromagnets by the manually operable plunger 78, such plunger being provided with a rod 79 which transmits the force to the valve disk 74 and the armature 77, such valve disk and armature being connected as indicated. The plunger 78 similarly to the plunger 50 is spring returned when released by means of the spring 80.

In using the invention shown in Figure 20 the operator moves the regulator 9 to open position and sets it at the desired temperature. Thereafter the operator sets the clock 71 for the time at which he wishes the oven burner lighted and sets the clock 56 at the time he wishes the oven burner extinguished. When the operator moves the oven regulator 9 to open position, the sub-burner 14 and the extension burner 20, see Figures 3 and 4, are lighted as previously described. Thereafter the operator waits a few seconds and presses the plungers 50 and 78, the electromagnets 38 and 68 holding their armatures 48 and 77 in contact with the poles of such electromagnets due to their energization from their respective thermocouples 24 and 24'. The valve 10 is thus held in open position and the valve 67 is held in closed position. When the clock 71 through its switch opens the circuit of the valve 67, such valve moves to open position under the influence of its biasing spring and fuel is furnished the oven burner. The oven burner lights from the sub-burner and operates until the clock 56 through its switch opens the circuit of the electromagnet for the valve 10, at which time the valve 10 closes under the influence of its biasing spring 49, thus cutting off the oven burner and leaving the sub-burner 14 and the extension burner 20 lighted.

It is to be noted from reference to Figure 13 that the cam member 45 on the switch controlled by the oven regulator has a face sufficiently wide to insure adequate opening of the regulator prior to closing the control circuit of the thermostat controlling the valve for admitting gas to the oven burner. The purpose of this construction is to preclude the possibility of admitting less than enough gas to the oven burner to insure lighting of the oven burner prior to closing the thermocouple control circuit. By this means the operator is compelled to open the regulator a sufficient distance to insure proper lighting of the oven burner before he can open the valve for admitting fuel to the burner.

The expression "gas stove" is intended to cover not only the domestic gas stove but any type of heating device of this general order where a main burner is used and a flashback means is employed in connection with a remote pilot which may, for example, be applied to core ovens, lead pot heaters, and other devices of a commercial nature, as well as the domestic gas stove.

It will be seen that means have been provided by this invention for lighting a burner which is spaced downwardly and perhaps laterally of a constantly burning pilot light, and that this means is so constructed that prior to ignition it provides a continuous column of a combustible mixture from the lower to the upper end of the downwardly extending tube and maintains this column of combustible mixture in unbroken continuity irrespective of stack velocity or temperature of the downwardly extending tube and also prevents excessive stack velocity which would preclude the possibilty of downward propagation of the flame.

It is to be noted also that the free venting of the tube insures the discharge of any cloud of water vapor that might act as a plug to prevent subsequent ignition. Also it is to be noted that condensation is prevented within either the downwardly extending tube 16 or the laterally extending tube 22. The downwardly extending tube is heated at its lower end from the sub-burner 14 and at its upper end from the extension burner 20 and is maintained at a temperature above that at which the condensation would occur at all points along its length. Also the tube 22 is heated at one end from the extension burner 20 and at its other end from the constantly burning pilot light. Consequently no condensation can occur at any point along its length as all portions of this tube are maintained at a temperature above that at which condensation would occur.

This invention also provides means whereby either wholly manual operation may be relied upon or clock controlled switch operation to cut off the oven burner may be used, or in which in addition to this, clock controlled switch means may be employed to turn on the oven burner at the desired time.

It is to be noted particularly that the energy required for energizing the electromagnets of the valves is furnished by thermocouples and is independent of the ordinary electric power source. Consequently this invention provides a device which is wholly safe in its operation for if the thermocouples were not heated in any form of the invention, it would be impossible to furnish fuel to the main burner.

It will be seen further that this invention provides a construction which is eminently practical and is easy to construct and is not dependent upon delicate and easily damaged parts and is foolproof and yet provides the utmost flexibility of control.

Although this invention has been described in considerable detail, it is to be understood that such description is intended as illustrative rather than limiting, as the invention may be variously embodied and is to be interpreted as claimed.

I claim:

1. The combination of a main burner, a pilot burner therefor, a thermocouple adapted to be heated by said pilot burner, a valve adapted to be manually opened and biased towards closed position and controlling the flow of fuel to said main burner, electromagnetic means connected in a circuit with said thermocouple and energized from said thermocouple for holding said valve in open position, said electromagnetic means being ineffective to cause opening of said valve, a clock controlled switch means for opening the circuit of said thermocouple, a second thermocouple heated by said pilot burner, a second valve connected in series with first mentioned valve and said main burner and biased towards open position and manually movable to closed position, a second electromagnetic means for holding said second valve in closed position and connected in a circuit with said second thermocouple, said second electromagnetic means being ineffective to cause closing of said second valve, and a clock controlled switch means for opening the circuit of said second thermocouple.

2. The combination of a main burner, a pilot burner therefor, a thermocouple adapted to be heated by said pilot burner, a valve adapted to be manually opened and biased towards closed position and controlling the flow of fuel to said main burner, electromagnetic means connected in a circuit with said thermocouple and energized from said thermocouple for holding said valve in open position, said electromagnetic means being ineffective to cause opening of said valve, switch means for opening the circuit of said thermocouple, a second thermocouple heated by said pilot burner, a second valve connected in series with first mentioned valve and said main burner and biased towards open position and manually movable to closed position, a second electromagnetic means for holding said second valve in closed position and connected in a circuit with said second thermocouple, said second electromagnetic means being ineffective to cause closing of said second valve, and switch means for opening the circuit of said second thermocouple.

FRANK A. GAUGER.

REFERENCES CITED

The following references are of record in the file of this patent:

UNITED STATES PATENTS

| Number | Name | Date |
| --- | --- | --- |
| 2,055,384 | Meacham | Sept. 22, 1936 |
| 2,249,442 | Thornberry | July 15, 1941 |
| 2,296,340 | Eskin | Sept. 22, 1942 |
| 2,353,042 | Koch | July 4, 1944 |